US012512601B2

(12) United States Patent
Yang

(10) Patent No.: US 12,512,601 B2
(45) Date of Patent: Dec. 30, 2025

(54) RADIATION ARRAY GROUP AND NARROW BEAM ANTENNA

(71) Applicants: PROSE TECHNOLOGIES (SUZHOU) CO., LTD., Suzhou (CN); PROSE TECHNOLOGIES LLC, Mount Olive, NJ (US)

(72) Inventor: Zhongcao Yang, Suzhou (CN)

(73) Assignees: PROSE TECHNOLOGIES (SUZHOU) CO., LTD., Suzhou (CN); PROSE TECHNOLOGIES LLC, Mount Olive, NJ (US)

( * ) Notice: Subject to any disclaimer, the term of this patent is extended or adjusted under 35 U.S.C. 154(b) by 85 days.

(21) Appl. No.: 18/631,601

(22) Filed: Apr. 10, 2024

(65) Prior Publication Data

US 2024/0283163 A1 Aug. 22, 2024

Related U.S. Application Data

(63) Continuation of application No. PCT/CN2022/104497, filed on Jul. 8, 2022.

(30) Foreign Application Priority Data

Dec. 27, 2021 (CN) ......................... 202111611519.X

(51) Int. Cl.
*H01Q 21/06* (2006.01)
*H01Q 21/28* (2006.01)

(52) U.S. Cl.
CPC ........... *H01Q 21/061* (2013.01); *H01Q 21/28* (2013.01)

(58) Field of Classification Search
CPC ...... H01Q 21/061; H01Q 21/28; H01Q 1/246; H01Q 1/36; H01Q 1/38; H01Q 21/00
See application file for complete search history.

(56) References Cited

U.S. PATENT DOCUMENTS 10,181,657 B2 * 1/2019 Ai ........................ H01Q 21/061
11,024,961 B2 * 6/2021 Anderson ............ H04B 7/0617
(Continued)

FOREIGN PATENT DOCUMENTS

CN 210111047 U * 2/2020
CN 210137016 U 3/2020
(Continued)

OTHER PUBLICATIONS

The World Intellectual Property Organization (WIPO) International Search Report for PCT/CN2022/104497 Sep. 28, 2022 5 Pages (including translation).

*Primary Examiner* — Seung H Lee
(74) *Attorney, Agent, or Firm* — ANOVA LAW GROUP, PLLC

(57) ABSTRACT

A radiation array group includes three columns of radiating elements: a plurality of first radiating elements in a first column, a plurality of second radiating elements in a second column, and a plurality of third radiating elements in a third column. A first radiating element and a third radiating element in a same row are electrically connected. Each radiating element of the plurality of first, second, and third radiating elements belongs to a first element group for forming a first two-port radiation array group or a second element group for forming a second two-port radiation array group. When the first radiating element and the third radiating element in the same row belong to the first element group, a second radiating element between the first radiating element and the third radiating element in the same row belongs to the second element group.

20 Claims, 8 Drawing Sheets

(56) References Cited

U.S. PATENT DOCUMENTS

| | | | | |
|---|---|---|---|---|
| 11,579,243 | B2 * | 2/2023 | Mayer | H01Q 1/3233 |
| 11,621,755 | B2 * | 4/2023 | Wu | H01Q 3/40<br>375/267 |
| 2018/0294578 | A1 | 10/2018 | Xiao et al. | |

FOREIGN PATENT DOCUMENTS

| | | | |
|---|---|---|---|
| CN | 112864602 | A | 5/2021 |
| CN | 214227140 | U | 9/2021 |
| CN | 216436125 | U | 5/2022 |

* cited by examiner

RADIATION ARRAY GROUP AND NARROW BEAM ANTENNA

CROSS-REFERENCES TO RELATED APPLICATIONS

This application is a continuation of International Application No. PCT/CN2022/104497, filed on Jul. 8, 2022, which claims priority to Chinese Patent Application No. 202111611519.X, filed on Dec. 27, 2021, the entire contents of both of which are incorporated herein by reference.

TECHNICAL FIELD

The present disclosure generally relates to the communication technology field and, more particularly, to a radiation array group with four ports and a narrow beam antenna including the radiation array group.

BACKGROUND

With the continuous and rapid development of mobile communication technology, mobile communication networks are continuously upgraded. As a critical device of the mobile communication networks, performance indicators and practical functions of a base station antenna are continuously improved. With a multi-frequency hybrid network base station antenna, a plurality of arrays of a single antenna cover can operate across a plurality of frequency bands and simultaneously support networks with a plurality of formats to reduce the total number of antennas in the network, reduce the cost of building the base station, and alleviate conflicts over antenna site resources.

Two columns of radiating elements are usually applied in a two-port 45-degree antenna. The distance between the two columns of radiating elements is large. Generally, a beamwidth of a single column of radiating elements is 65 degrees. A beamwidth formed by two columns of radiating arrays that are parallel in a horizontal direction is 38 degrees. The beamwidth of 45 degrees is realized by combining the single column and double columns of radiating elements with a certain ratio. However, with two columns of radiating elements, only two ports are formed.

To form four ports, the single-column two-port 45-degree antennas can be arranged in parallel. That is, four columns of radiating elements are arranged. Two columns of radiating elements form a two-port 45-degree antenna, and the other two columns of radiating elements form another two-port 45-degree antenna. Thus, although the radiation performance of the antenna may not be affected, the width of the antenna is doubled. Wind load increases significantly, and raw material cost, installation cost, and tower load cost are also increased significantly.

Of course, to avoid increasing the antenna width, the antenna length can be sacrificed. That is, a two-port 45-degree antenna is arranged at the upper half of the antenna, and the other two-port 45-degree antenna is arranged at the lower half of the antenna. However, although the width of the antenna is not changed by arranging the single-column two-port 15-degree antennas up and down, the length of each port array is halved. Thus, with the same length, gain loss is caused in the antenna.

SUMMARY

In view of a deep understanding of the problems existing in the background technology, the present disclosure provides a four-port narrow-beam antenna. A radiation array group is provided without increasing or slightly increasing the width of the radiation array group to cause the radiation array group to form the four-port narrow-beam antenna.

A first aspect of the present disclosure provides a radiation array group including three columns of radiating elements. The three columns of radiating elements include a plurality of first radiating elements in a first column, a plurality of second radiating elements in a second column, and a plurality of third radiating elements in a third column. A first radiating element and a third radiating element in a same row are electrically connected. Each radiating element of the plurality of first radiating elements, the plurality of second radiating elements, and the plurality of third radiating elements belongs to a first element group for forming a first two-port radiation array group or a second element group for forming a second two-port radiation array group. When the first radiating element and the third radiating element in the same row belong to one of the first element group and the second element group, a second radiating element between the first radiating element and the third radiating element in the same row belong to the other one of the first element group and the second element group.

A second aspect of the present disclosure provides a narrow-beam antenna. The narrow-beam antenna includes: a radiation array group according to the first aspect of the present disclosure; and a power-dividing board connected to the radiation array group.

In summary, since the first radiating element and the third radiating element in the same row are electrically connected and belong to the first element group for forming the two-port radiation array group. The second radiating element in the same row or approximately in the same row as the first radiating element belongs to the second element group for forming another two-port radiation array group. The distances among the first radiating element, the second radiating element, and the third radiating element can be reduced significantly. Thus, the width of the radiation array group may not be increased or may be slightly increased. Meanwhile, since the radiation array group includes the first element group and the second element group for forming the two-port radiation array groups, the radiation array group of the present disclosure can form the four-port radiation array group.

BRIEF DESCRIPTION OF THE DRAWINGS

Embodiments are shown and described with reference to the drawings. The drawings are used to illustrate the basic principles. Thus, only aspects necessary for understanding the basic principles are shown. The accompanying drawings are not according to scales. In the accompanying drawings, identical reference numbers indicate similar features.

The other features, characteristics, advantages, and benefits of the present disclosure can become more obvious through the following description in connection with the accompanying drawings.

DETAILED DESCRIPTION OF THE EMBODIMENTS

In the description of embodiments below, reference is made to the accompanying drawings that form a part of the present disclosure. The accompanying drawings illustrate embodiments of the present disclosure with examples. Exemplary embodiments are not intended to exhaust all embodiments according to the present disclosure. Without departing from the scope of the present disclosure, other embodiments can be used, and structural or logical modifications can be made. Therefore, the description below is not limiting, and the scope of the present disclosure is defined by the appended claims.

In the existing technology, when the existing four-port narrow-beam antenna is configured with four columns of radiating elements, the narrow-beam antenna can be too wide, which causes high wind resistance and installation cost, or when the antenna length is sacrificed to form the beam, the gain loss can be caused with the same length, which reduces the antenna performance.

For the above technical problems, the present disclosure provides a four-port narrow-beam antenna. That is, without increasing or with slightly increasing the width of the radiation array group, the radiation array group can be configured to cause the radiation array group to form a four-port narrow-beam antenna.

Figure 1:
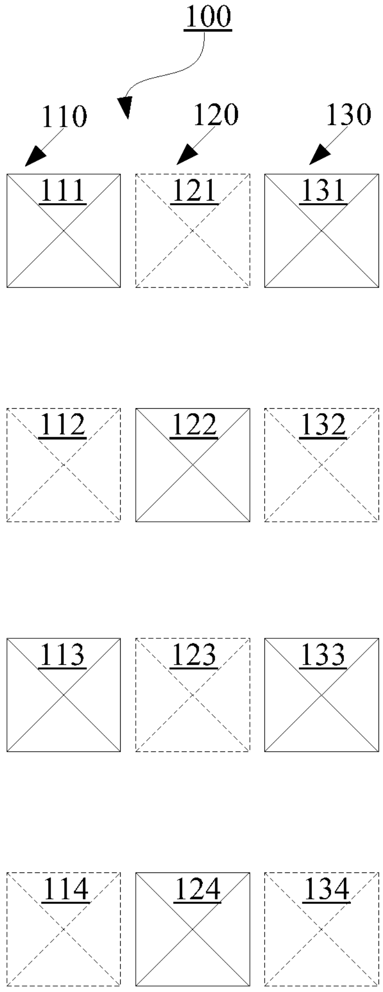
FIG. 1 is a schematic structural diagram of a radiation array group 100 according to some embodiments of the present disclosure.

FIG. 1 is a schematic structural diagram of a radiation array group 100 according to some embodiments of the present disclosure. As shown in FIG. 1, the radiation array group 100 includes three columns of radiating elements. The three columns of radiating elements include a plurality of first radiating elements 111, 112, 113, and 114 located in a first column 110, a plurality of second radiating elements 121, 122, 123, and 124 located in a second column 120, and a plurality of third radiating elements 131, 132, 133, and 134 located in a third column 130. A first radiating element and a third radiating element in a same row can be electrically connected. For example, the first radiating element 111 is electrically connected to the third radiating element 131, the first radiating element 112 is electrically connected to the third radiating element 132, the first radiating element 113 is electrically connected to the third radiating element 133, and the first radiating element 114 is electrically connected to the third radiating element 134. To represent the connection relationship, the radiating elements that are connected to each other can be represented by the same symbols. For example, the radiating element 111 and the radiating element 131 that are electrically connected to each other are represented by solid lines, and the radiating element 112 and the radiating element 132 that are electrically connected to each other are represented by dashed lines, and so on, which is not repeated.

In general, each radiating element in the multiple first radiating elements 121, 122, 123, and 124, the multiple second radiating elements 121, 122, 123, and 124, and the multiple third radiating elements 131, 132, 133, and 134 belongs to (or is included in) either the first element group for forming the first two-port radiating element array or the second element group for forming the second two-port radiating element array. Here, the first element group for forming the first two-port radiating element array includes radiating elements such as those identified by solid lines in FIG. 1, including radiating elements 111, 131, 122, 113, 133, and 124, while the second element group for forming the second two-port radiating element array includes radiating elements such as those identified by dashed lines in FIG. 1, including radiating elements 121, 112, 132, 123, 114, and 134.

Furthermore, when the first radiating element and the third radiating element that are in the same row belong to the first element group, the second radiating element that is between and in the same row with the first radiating element and the third radiating element can belong to the second element group. For example, the first radiating element 111 and the third radiating element 131 are in the same row. When the first radiating element 111 and the third radiating element 131 belong to the first element group represented by solid lines, the second radiating element 121 between the first radiating element 111 and the third radiating element 131 should belong to the second element group represented by dashed lines. That is, a radiating element in the first column and a corresponding radiating element in the third column should belong to the same element group, and a radiating element in the second column between the first column and the second column should belong to another element group.

Thus, in the radiation array group 100 of the present disclosure, since the first radiating element (e.g., the first radiating element 111) and the third radiating element (e.g., the third radiating element 131) in the same row are electrically connected and belong to the first element group for forming a two-port radiation array group, the second radiating element (e.g., the second radiating element 121) in the same row or approximately in the same row with the first radiating element (e.g., the first radiating element 111) can belong to a second element group forming another two-port radiation array group. Thus, distances between the elements 111, 121, and 131 can be significantly reduced. Thus, the width of the radiation array group 100 may not be increased or slightly increased. Meanwhile, since the radiation array group 100 includes a first element group and a second element group forming the two-port radiation array group. Thus, according to the radiation array group 100 of the present disclosure, four-port radiation array group can be formed.

Figure 2:
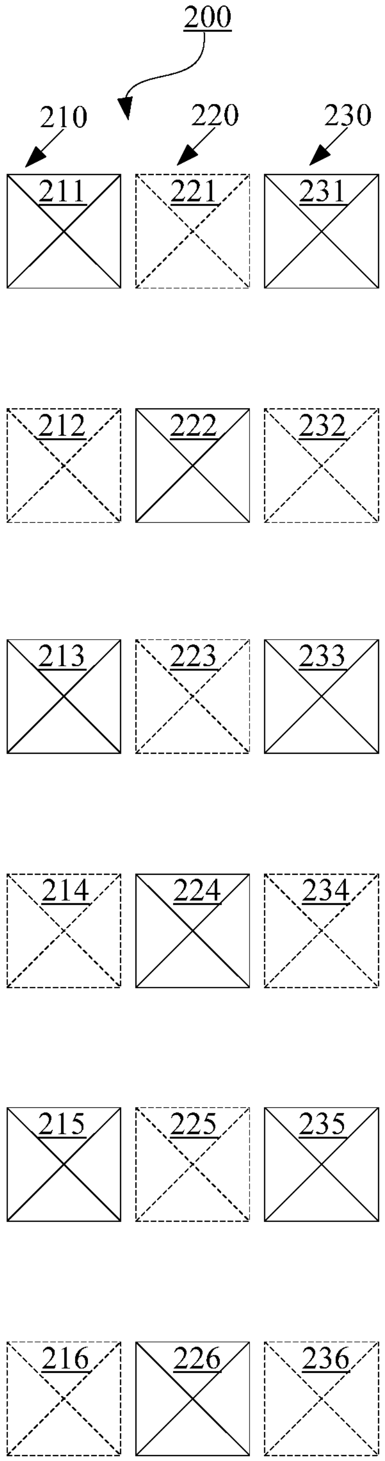
FIG. 2 is a schematic structural diagram of a radiation array group 200 according to some embodiments of the present disclosure.

FIG. 2 is a schematic structural diagram of a radiation array group 200 according to some embodiments of the present disclosure. The main difference between FIG. 2 and FIG. 1 is that FIG. 2 includes six rows of radiating elements, i.e., FIG. 2 has two more rows of radiating elements than the radiation array group 100 in FIG. 1. In some embodiments, as shown in FIG. 2, the radiation array group of the present disclosure includes three columns of radiating elements. The three columns of radiating elements include a plurality of first radiating elements 211, 212, 213, 214, 215, and 216 in a first column 210, a plurality of second radiating elements

221, 222, 223, 224, 225, and 226 in a second column 220, and a plurality of third radiating elements 231, 232, 233, 234, 235, and 236 in a third column 230. The first radiating element and the third radiating element in the same row are electrically connected. For example, the first radiating element 211 is electrically connected to the third radiating element 231, the first radiating element 212 is electrically connected to the third radiating element 232, the first radiating element 213 is electrically connected to the third radiating element 233, the first radiating element 214 is electrically connected to the third radiating element 234, the first radiating element 215 is electrically connected to the third radiating element 235, and the first radiating element 216 is electrically connected to the third radiating element 236. To represent the connection relationship, the radiating elements that are electrically connected to each other are represented using the same symbol in FIG. 2. For example, the radiating elements 211 and 231 that are electrically connected are represented by solid lines, and the radiating elements 212 and 232 that are electrically connected are represented by dashed lines, and so on.

In general, each radiating element of the plurality of first radiating elements 211, 212, 213, 214, 215, and 216, the plurality of second radiating elements 221, 222, 223, 224, 225, and 226, and the plurality of third radiating elements 231, 232, 233, 234, 235, and 236 can belong to either the first element group for forming the first two-port radiation array group or the second element group for forming the second two-port radiation array group. The first element group for forming the first two-port radiation array group can include radiating elements such as the radiating elements 211, 231, 222, 213, 233, 224, 215, 235, and 226 identified by solid lines in FIG. 2. The second element group for forming the second two-port radiation array group can include radiating elements such as radiating elements 221, 212, 232, 223, 214, 234, 225, 216, and 236 identified by dashed lines in FIG. 2.

Furthermore, when the first radiating element and the third radiating element in the same row belong to the first element group, the second radiating element between the first radiating element and the third radiating element in the same row can belong to the second element group. For example, the first radiating element 211 and the third radiating element 231 can be in the same row. When the first radiating element 211 and the third radiating element 231 belong to the first element group represented by solid lines, the second radiating element 221 represented by dashed lines between the first radiating element 211 and the third radiating element 231 can belong to the second element group. That is, a radiating element of the first column and a radiating element of the third column can belong to the same element group, and a radiating element of the second column between the radiating element of the first column and the radiating element of the third column can belong to another element group.

Figure 3:
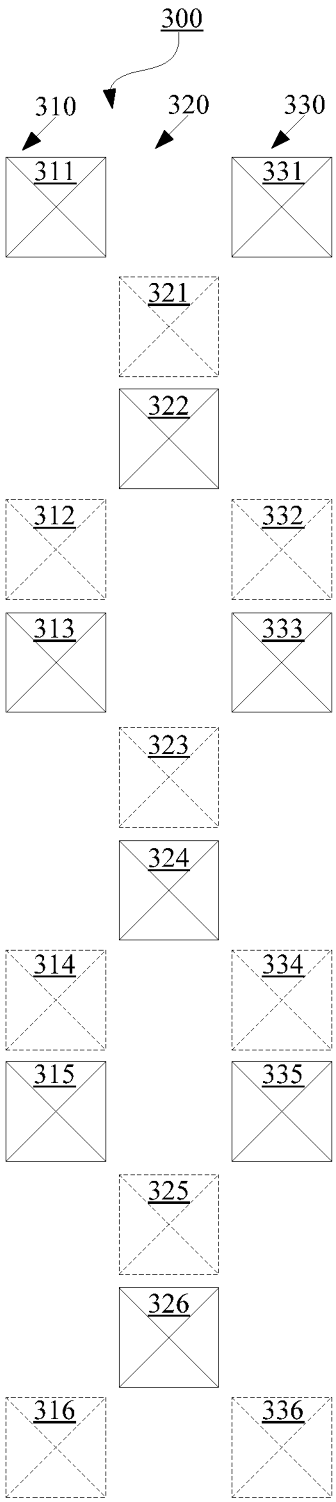
FIG. 3 is a schematic structural diagram of a radiation array group 300 according to some embodiments of the present disclosure.

FIG. 3 is a schematic structural diagram of a radiation array group 300 according to some embodiments of the present disclosure. The difference from FIG. 2 is that an N-th radiating element in the first column and an N-th radiating element in the third column are in the same row, but the N-th radiating element in the first column and the N-th radiating element in the third column are not in the same row with an N-th radiating element of the second column. In some embodiments, the first radiating element 311 in the first column 310 and the first radiating element 331 in the third column 330 are in the same row. However, the first radiating element 311 in the first column 310 and the first radiating element 331 in the third column 330 are not in the same row as the first radiating element 321 in the second column 320. The second radiating element 312 in the first column 310 and the second radiating element 332 in the third column 330 are in the same row. However, the second radiating element 312 in the first column 310 and the second radiating element 332 in the third column 330 are not in the same row as the second radiating element 322 in the second column 320. The third radiating element 313 in the first column 310 and the third radiating element 333 in the third column 330 are in the same row. However, the third radiating element 313 in the first column 310 and the third radiating element 333 in the third column 330 are not in the same row as the third radiating element 323 in the second column 320. The fourth radiating element 314 in the first column 310 and the fourth radiating element 334 in the third column 330 are in the same row. However, the fourth radiating element 314 in the first column 310 and the fourth radiating element 334 in the third column 330 are not in the same row as the fourth radiating element 324 in the second column 320. The fifth radiating element 315 in the first column 310 and the fifth radiating element 335 in the third column 330 are in the same row. However, the fifth radiating element 315 in the first column 310 and the fifth radiating element 335 in the third column 330 are not in the same row as the fifth radiating element 325 in the second column 320. The sixth radiating element 316 in the first column 310 and the sixth radiating element 336 in the third column 330 are in the same row. However, the sixth radiating element 316 in the first column 310 and the sixth radiating element 336 in the third column 330 are not in the same row as the sixth radiating element 326 in the second column 320. Thus, the radiating elements can be staggered to further improve the radiation performance of the narrow-beam radiating element group 300.

In addition, similar to FIG. 1 and FIG. 2, as shown in FIG. 3, the radiation array group 300 of the present disclosure includes three columns of radiating elements. The three columns of radiating elements include the plurality of first radiating elements 311, 312, 313, 314, 315, and 316 in the first column 310, the plurality of second radiating elements 321, 322, 323, 324, 325, and 326 in the second column 320, and the plurality of third radiating elements 331, 332, 333, 334, 335, and 336 in the third column 330. A first radiating element and a third radiating element in the same row can be electrically connected. For example, the first radiating element 311 is electrically connected to the third radiating element 331, the first radiating element 312 is electrically connected to the third radiating element 332, the first radiating element 313 is electrically connected to the third radiating element 333, the first radiating element 314 is electrically connected to the third radiating element 334, the first radiating element 315 is electrically connected to the third radiating element 335, and the first radiating element 316 is electrically connected to the third radiating element 336. To represent the connection relationship, in FIG. 3, radiating elements that are electrically connected to each other are represented using the same symbol. For example, the radiating elements 311 and 331 that are electrically connected can be represented by solid lines, and the radiating elements 312 and 332 that are electrically connected can be represented by dashed lines, and so on.

In general, each radiating element of the plurality of first radiating elements 311, 312, 313, 314, 315, and 316, the plurality of second radiating elements 321, 322, 323, 324, 325, and 326, and the plurality of third radiating elements 331, 332, 333, 334, 335, and 336 can belong to either the first element group for forming the first two-port radiation array group or the second element group for forming the second two-port radiation array group. The first element group for forming the first two-port radiation array group includes radiating elements 311, 331, 322, 313, 333, 324, 315, 335, and 326 represented by solid lines in FIG. 3. The second element group for forming the second two-port radiation array group includes radiating elements 321, 312, 332, 323, 314, 334, 325, 316, and 336 represented by dashed lines in FIG. 3.

Additionally, when the first radiating element and the third radiating element in the same row belong to the first element group, the second radiating element that is in the same row with and between the first radiating element and the third radiating element can belong to the second element group. For example, the first radiating element 311 and the third radiating element 331 are in the same row. When the first radiating element 311 and the third radiating element 331 belong to the first element group represented by solid lines, the second radiating element 321 represented by dashed lines between the first radiating element 311 and the third radiating element 331 can belong to the second element group. That is, a radiating element in the first column and a radiating element in the third column in the same row can belong to the same element group, and a radiating element in the second column between the radiating element in the first column and the radiating element in the third column can belong to another element group. Here, a second radiating element between a first radiating element and a third radiating element but not in the same row may refer to a radiating element in the second column and in a row closest to the row of the first and third radiating elements. For example, the second radiating element 321 is considered as between the first radiating element 311 and the third radiating element 331; and the second radiating element 322 is considered as between the first radiating element 312 and the third radiating 332.

Furthermore, as shown in the examples in FIG. 1 and FIG. 2, the first radiating element and the third radiating element in the same row are in the same row with the second radiating element between the first radiating element and the third radiating element. That is, the N-th radiating element in the first column, the N-th radiating element in the second column, and the N-th radiating element in the third column can be in the same row. In contrast, in the example shown in FIG. 3, the first radiating element and the third radiating element in the same row are not in the same row with the second radiating element between the first radiating element and the third radiating element in the same row. That is, the N-th radiating element in the first column and the N-th radiating element in the third column can be in the same row. However, the N-th radiating element in the first column and the N-th radiating element in the third column are not in the same row as the N-th radiating element in the second row.

Moreover, as shown in FIG. 1, each column includes four radiating elements. As shown in FIG. 2 and FIG. 3, each column includes six radiating elements. Two neighboring radiating elements of each column can belong to the first element group and the second element group, respectively. That is, the neighboring radiating elements can be alternately represented by solid lines and dashed lines. The first radiating elements in the first column can be alternately included in the first element group and the second element group. The second radiating elements in the second column can be alternately included in the second element group and the first element group.

Figure 4:
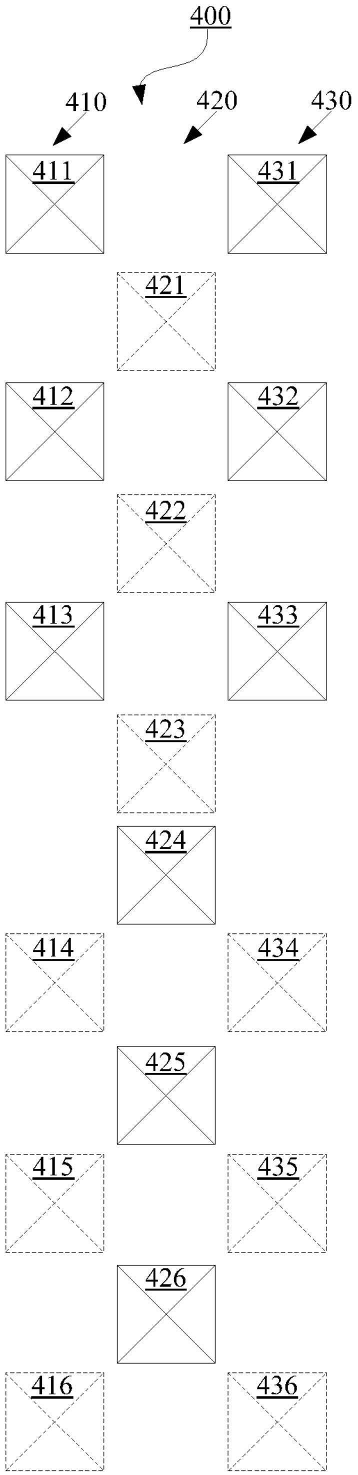
FIG. 4 is a schematic structural diagram of a radiation array group 400 according to some embodiments of the present disclosure.

FIG. 4 is a schematic structural diagram of a radiation array group 400 according to some embodiments of the present disclosure. As shown in FIG. 4, similar to FIG. 3, the N-th radiating element in the first column and the N-th radiating element in the third column are in the same row, but the N-th radiating element in the first column and the N-th radiating element in the third column are not in the same row with the N-th radiating element in the second column. In some embodiments, the first radiating element 411 in the first column 410 and the first radiating element 431 in the third column 430 are in the same row. However, the first radiating element 411 in the first column 410 and the first radiating element 431 in the third column 430 are not in the same row as the first radiating element 421 in the second column 420. The second radiating element 412 in the first column 410 and the second radiating element 432 in the third column 430 are in the same row. However, the second radiating element 412 in the first column 410 and the second radiating element 432 in the third column 430 are not in the same row as the second radiating element 422 in the second column 420. The third radiating element 413 in the first column 410 and the third radiating element 433 in the third column 430 are in the same row. However, the third radiating element 413 in the first column 410 and the third radiating element 433 in the third column 430 are not in the same row as the third radiating element 423 in the second column 420. The fourth radiating element 414 in the first column 410 and the fourth radiating element 434 in the third column 430 are in the same row. However, the fourth radiating element 414 in the first column 410 and the fourth radiating element 434 in the third column 430 are not in the same row as the fourth radiating element 424 in the second column 420. The fifth radiating element 415 in the first column 410 and the fifth radiating element 435 in the third column 430 are in the same row. However, the fifth radiating element 415 in the first column 410 and the fifth radiating element 435 in the third column 430 are not in the same row as the fifth radiating element 425 in the second column 420. The sixth radiating element 416 in the first column 410 and the sixth radiating element 436 in the third column 430 are in the same row. However, the sixth radiating element 416 in the first column 410 and the sixth radiating element 436 in the third column 430 are not in the same row as the sixth radiating element 426 in the second column 420. Thus, the radiating elements can be staggered to further improve the radiation performance of the narrow-beam radiating element group 400.

Additionally, similar to FIG. 1 to FIG. 3, as shown in FIG. 4, the radiation array group 400 of the present disclosure includes three columns 410, 420, and 430. The three columns of radiating elements include the plurality of first radiating elements 411, 412, 413, 414, 415, and 416 in the first column 410, the plurality of second radiating elements 421, 422, 423, 424, 425, and 426 in the second column 420, and the plurality of third radiating elements 431, 432, 433, 434, 435, and 436 in the third column 430. The first radiating element and the third radiating element in the same row are electrically connected. For example, the first radiating element 411 and the third radiating element 431 are electrically connected, the first radiating element 412 and the third radiating element 432 are electrically connected, and the first radiating element 413 and the third radiating element 433 are electrically connected, the first radiating element 414 and the third radiating element 434 are electrically connected, the first radiating element 415 and the third radiating element 435 are electrically connected, the first radiating element 416 and the third radiating element 436 are electrically connected. To represent the connection relationship, radiating elements that are electrically connected are represented by the same symbols in FIG. 4. For example, the radiating element 411 and the radiating element 431 that are mutually electrically connected are represented by solid lines, and the radiating element 414 and the radiating element 434 that are mutually electrically connected are represented by dashed lines, and so on.

In general, each radiating element of the plurality of first radiating elements 411, 412, 413, 414, 415, and 416, the plurality of second radiating elements 421, 422, 423, 424, 425, and 426, and the plurality of third radiating elements 431, 432, 433, 434, 435, and 436 can belong to the first element group for forming the first two-port radiation array group or belongs to the second element group for forming the second two-port radiation array group. The first element group for forming the first two-port radiation array group includes radiating elements 411, 431, 424, 412, 432, 425, 413, 433, and 426 represented by solid lines in FIG. 4. The second element group for forming the second two-port radiation array group includes radiating elements 414, 434, 421, 415, 435, 422, 416, 436, and 423 represented by dashed lines in FIG. 4.

Furthermore, in the exemplary radiating element group shown in FIG. 4, the six radiating elements in each column are not alternately included in the first element group and the second element group with one-element spacing, but are alternately included in the first element group and second element group with three-element spacing. Specifically, In some embodiments, the first three radiating elements 411, 412, and 413 in the first column 410 belong to the first element group represented by solid lines, while the last three radiating elements 414, 415, and 416 in the first column 410 belong to the second element group represented by dashed lines. The first three radiating elements 421, 422, and 423 in the second column 420 belong to the second element group represented by dashed lines, while the last three radiating elements 424, 425, and 426 in the second column 420 belong to the first element group represented by solid lines. The first three radiating elements 431, 432, and 433 in the third column 430 belong to the first element group represented by solid lines, while the last three radiating elements 434, 435, and 436 in the third column 430 belong to the second element group represented by dashed lines.

Additionally, when the first radiating element and the third radiating element in the same row belong to the first element group, the second radiating element between the first radiating element and the third radiating element in the same row can belong to the second element group. For example, if the first radiating element 411 and the third radiating element 431 are in the same row, when the first radiating element 411 and the third radiating element 431 belong to the first element group represented by solid lines, the second radiating element 421 represented by dashed lines between the first radiating element 411 and the third radiating element 431 can belong to the second element group. That is, a radiating element in the first column and a corresponding radiating element in the third column can belong to the same element group, while a radiating element in the second column between the radiating element in the first column and the corresponding radiating element in the third column can belong to another element group.

As shown in the exemplary radiation array groups in FIGS. 1 to 4, a first quantity of the radiating elements in the first element group is the same as a second quantity of the radiating elements in the second element group.

Figure 5:
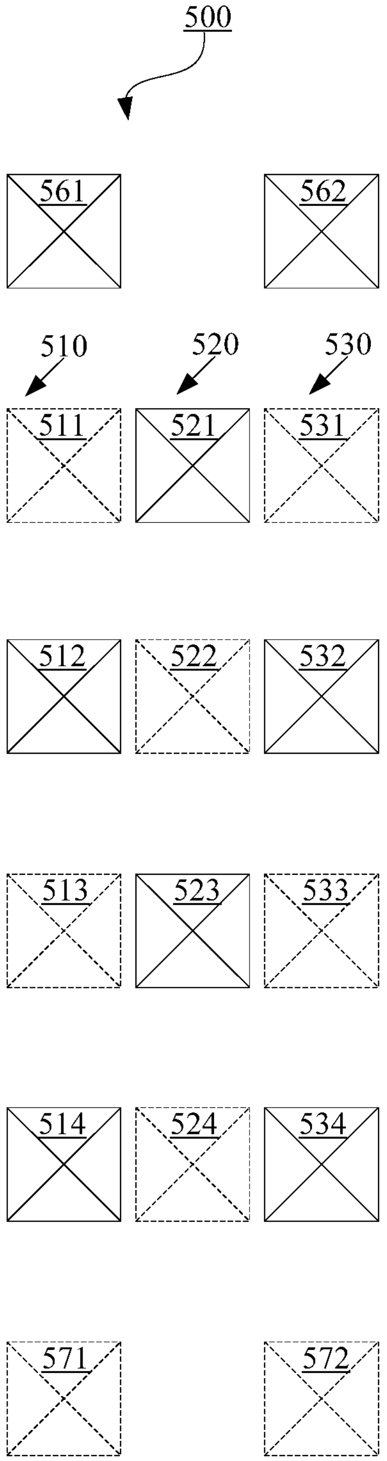
FIG. 5 is a schematic structural diagram of a radiation array group 500 according to some embodiments of the present disclosure.

FIG. 5 is a schematic structural diagram of a radiation array group 500 according to some embodiments of the present disclosure. As shown in FIG. 5, the radiation array group 500 of the present disclosure includes three columns of radiating elements. The three columns of radiating elements include a plurality of first radiating elements 511, 512, 513, and 514 in the first column 510, a plurality of second radiating elements 521, 522, 523, and 524 in the second column 520, and a plurality of third radiating elements 531, 532, 533, and 534 in the third column 530. A first radiating element and a third radiating element in the same row can be electrically connected. For example, the first radiating element 511 and the third radiating element 531 are electrically connected, the first radiating element 512 and the third radiating element 532 are electrically connected, the first radiating element 513 and the third radiating element 533 are electrically connected, and the first radiating element 514 and the third radiating element 534 are electrically connected. To represent the connection relationship, the radiating elements that are electrically connected to each other can be indicated by the same symbol in FIG. 5. For example, the radiating element 511 and the radiating element 531 are represented by dashed lines, and the radiating element 512 and the radiating element 532 are represented by solid lines, and so on.

In general, each radiating element of the plurality of first radiating elements 511, 512, 513, and 514, the plurality of second radiating elements 521, 522, 523, and 524, and the plurality of third radiating elements 531, 532, 533, and 534 can belong to the first element group for forming the first two-port radiation array group or with the second element group for forming the second two-port radiation array group. The first element group for forming the first two-port radiation array group includes the radiating elements 521, 512, 532, 523, 514, and 534 represented by solid lines in FIG. 5. The second element group for forming the second two-port radiation array group includes radiating elements 511, 531, 522, 513, 533, and 524 represented by dashed lines in FIG. 5.

Additionally, when a first radiating element and a third radiating element in the same row belong to the first element group, a second radiating element between the first radiating element and the third radiating element in the same row can belong to the second element group. For example, if the first radiating element 511 and the third radiating element 531 are in the same row, when the first radiating element 511 and the third radiating element 531 belong to the second element group represented by dashed lines, the second radiating element 521 represented by solid lines between the first radiating element 511 and the third radiating element 531 can belong to the first element group. That is, a radiating element in the first column and a corresponding radiating element in the third column can belong to the same element group, while a radiating element in the second column between the radiating element in the first column and the corresponding radiating element in the third column can belong to another element group.

Furthermore, a difference between the exemplary radiation array group 500 shown in FIG. 5 and the radiation array group 100 shown in FIG. 1 is two rows of independent radiating elements are added to the front and back in addition to the radiation array group with four rows for forming the four-port narrow-beam antenna. That is, the first independent array radiating element group including radiating elements 561 and 562 and the second independent array radiating element group including radiating elements 571 and 572 are respectively at the first row and the last row away from the center position. The first independent array radiating element group and the second independent array radiating element group each can include at least two radiating elements. The at least two radiating elements 561 and 562 of the first independent array radiating element group can belong to the first element group. The at least two radiating elements 571 and 572 of the second independent array radiating element group can belong to the second element group.

Figure 6:
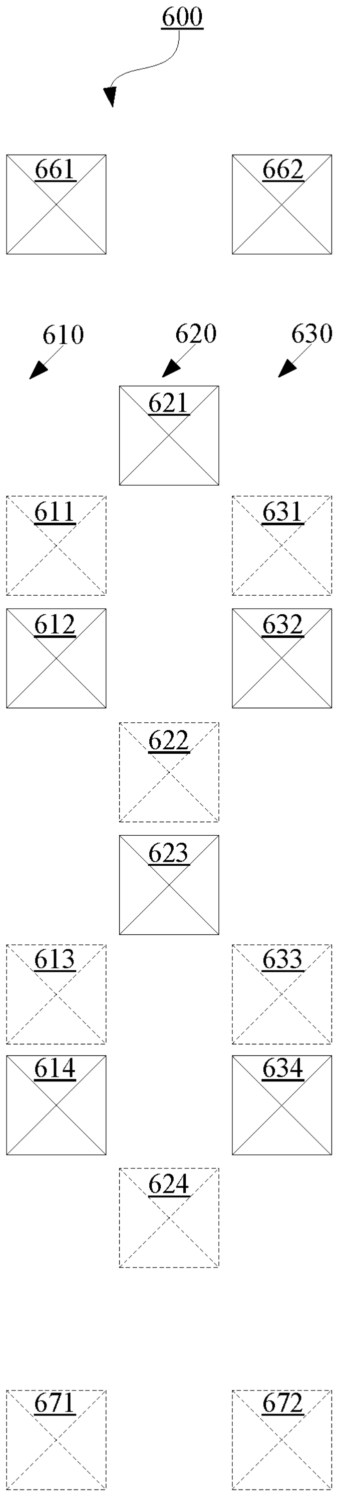
FIG. 6 is a schematic structural diagram of a radiation array group 600 according to some embodiments of the present disclosure.

FIG. 6 is a schematic structural diagram of a radiation array group 600 according to some embodiments of the present disclosure. As shown in FIG. 6, the radiation array group 600 according to the present disclosure includes three columns. The three columns of radiating elements include a plurality of first radiating elements 611, 612, 613, and 614 in the first column 610, a plurality of second radiating elements 621, 622, 623, and 624 in the second column 620, and a plurality of third radiating elements 631, 632, 633, and 634 in the third column 630. A first radiating element and a third radiating element in the same row can be electrically connected. For example, the first radiating element 611 and the third radiating element 631 are electrically connected, the first radiating element 612 and the third radiating element 632 are electrically connected, the first radiating element 613 and the third radiating element 633 are electrically connected, and the first radiating element 614 and the third radiating element 634 are electrically connected. To represent the connection relationship, the radiating elements that are electrically connected are represented by the same symbol in FIG. 6. For example, the radiating element 611 and the radiating element 631 that are electrically connected are represented by dashed lines, and the radiating element 612 and the radiating element 632 that are electrically connected are represented by solid lines, and so on.

In general, each radiating element of the plurality of first radiating elements 611, 612, 613, and 614, the plurality of second radiating elements 621, 622, 623, and 624, and the plurality of third radiating elements 631, 632, 633, and 634 belongs to the first element group for forming the first two-port radiation array group or with the second element group for forming the second two-port radiation array group. In some embodiments, the first element group for forming the first two-port radiation array group includes radiating elements 621, 612, 632, 623, 614, and 634 represented by solid lines in FIG. 6. The second element group for forming the second two-port radiation array group includes radiating elements 611, 631, 622, 613, 633, and 624 represented by dashed lines in FIG. 6.

Additionally, when the first radiating element and the third radiating element in the same row belong to the first element group, the second radiating element between the first radiating element and the third radiating element in the same row can belong to the second element group. For example, if the first radiating element 611 and the third radiating element 631 are in the same row, when the first radiating element 611 and the third radiating element 631 belong to the second element group represented by dashed lines, the second radiating element 621 represented by solid lines between the first radiating element 611 and the third radiating element 631 can belong to the first element group. That is, a radiating element in the first column and a corresponding radiating element in the third column can belong to the same element group, while a radiating element in the second column between the radiating element in the first column and the corresponding radiating element in the third column can belong to another element group.

In the exemplary radiation array group 600 shown in FIG. 6, two rows of independent radiating elements are added to the front and back in addition to the four groups for forming the four-port narrow-beam antenna are added. That is, the first independent array radiating element group including radiating elements 661 and 662 and the second independent array radiating element group including radiating elements 671 and 672 are at the front row and the last row away from the center position. The first independent array radiating element group and the second independent array radiating element group each can include at least two radiating elements. The at least two radiating elements 661 and 662 of the first independent array radiating element group can belong to the first element group. The at least two radiating elements 671 and 672 of the second independent array radiating element group can belong to the second element group.

Figure 7:
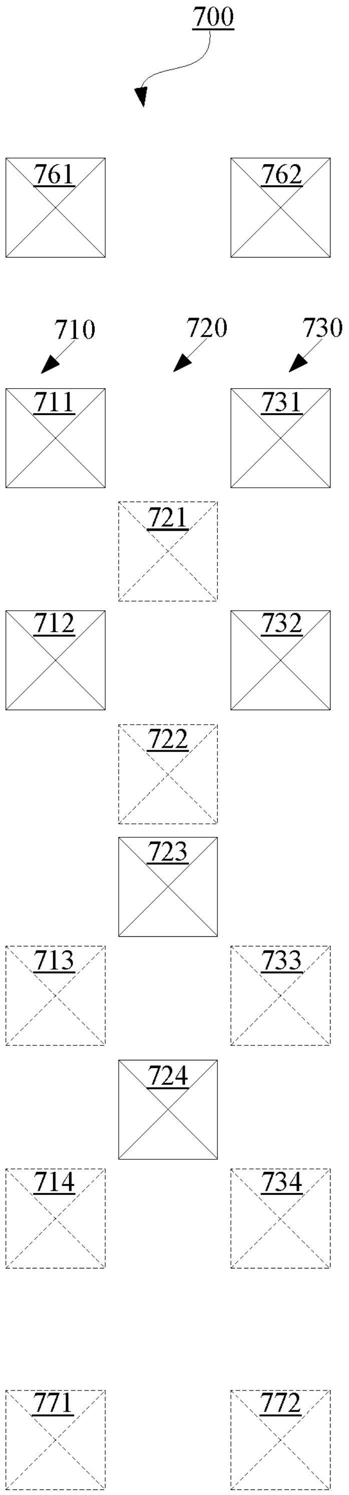
FIG. 7 is a schematic structural diagram of a radiation array group 700 according to some embodiments of the present disclosure.

FIG. 7 is a schematic structural diagram of a radiation array group 700 according to some embodiments of the present disclosure. As shown in FIG. 7, the radiation array group 700 of the present disclosure includes three columns of radiating elements. The three columns of radiating elements include a plurality of first radiating elements 711, 712, 713, and 714 in the first column 710, a plurality of second radiating elements 721, 722, 723, and 724 in the second column 720, and a plurality of third radiating elements 731, 732, 733, and 734 in the third column 730. A first radiating element and a third radiating element in the same row can be electrically connected. For example, the first radiating element 711 and the third radiating element 731 are electrically connected, the first radiating element 712 and the third radiating element 732 are electrically connected, the first radiating element 713 and the third radiating element 733 are electrically connected, and the first radiating element 714 and the third radiating element 734 are electrically connected. To represent the connection relationship, the radiating elements that are electrically connected are represented by the same symbol in FIG. 7. For example, the radiating element 711 and the radiating element 731 that are electrically connected are represented by solid lines, and the radiating element 713 and the radiating element 733 that are electrically connected are represented by dashed lines, and so on.

In general, each radiating element of the plurality of first radiating elements 711, 712, 713, and 714, the plurality of second radiating elements 721, 722, 723, and 724, and the plurality of third radiating elements 731, 732, 733, and 734 belongs to the first element group for forming the first two-port radiation array group or the second element group for forming the second two-port radiation array group. The first element group for forming the first two-port radiation array group includes radiating elements 711, 731, 723, 712, 732, and 724 represented by solid lines in FIG. 7. The second element group for forming the second two-port radiation array group includes radiating elements 713, 733, 721, 714, 734, and 722 represented by dashed lines in FIG. 7.

Additionally, when the first radiating element and the third radiating element in the same row belong to the first element group, the second radiating element between the first radiating element and the third radiating element in the same row can belong to the second element group. For example, if the first radiating element 711 and the third radiating element 731 are in the same row, when the first radiating element 711 and the third radiating element 731 belong to the first element group represented by solid lines, the second radiating element 721 represented by dashed lines between the first radiating element 711 and the third radiating element 731 can belong to the second element group. That is, a radiating element in the first column and a corresponding radiating element in the third column can belong to the same element group, and the radiating element in the second column between the radiating element in the first column and the corresponding radiating element in the third column can belong to another element group.

In the exemplary radiation array group 700 shown in FIG. 7, two rows of independent radiating elements are added to the front and back in addition to the four radiation array groups for forming the four-port narrow-beam antenna. That is, the first independent array radiating element group including radiating elements 761 and 762 and the second independent array radiating element group including radiating elements 771 and 772 can be at the first row and the last row away from the center positions. The first independent array radiating element group and the second independent array radiating element group each can include at least two radiating elements. The at least two radiating elements 761 and 762 of the first independent array radiating element group can belong to the first element group. The at least two radiating elements 771 and 772 of the second independent array radiating element group can belong to the second element group.

Additionally, in the exemplary radiating element groups shown in FIG. 7, the four radiating elements of each column are not alternately included in the first element group and the second element group with one element space but are alternately included in the first element group and the second element group with two elements space. In some embodiments, the first two radiating elements 711 and 712 in the first column 710 can belong to the first element group represented by solid lines. The last two radiating elements 713 and 714 in the first column 710 can belong to the second element group represented by dashed lines. The first two radiating elements 721 and 722 in the second column 720 can belong to the second element group represented by dashed lines. The last two radiating elements 723 and 724 in the second column 720 can belong to the first element group represented by solid lines. The first two radiating elements 731 and 732 in the third column 730 can belong to the first element group represented by solid lines. The last two radiating elements 733 and 734 in the third column 730 can belong to the second element group represented by dashed lines.

Figure 8:
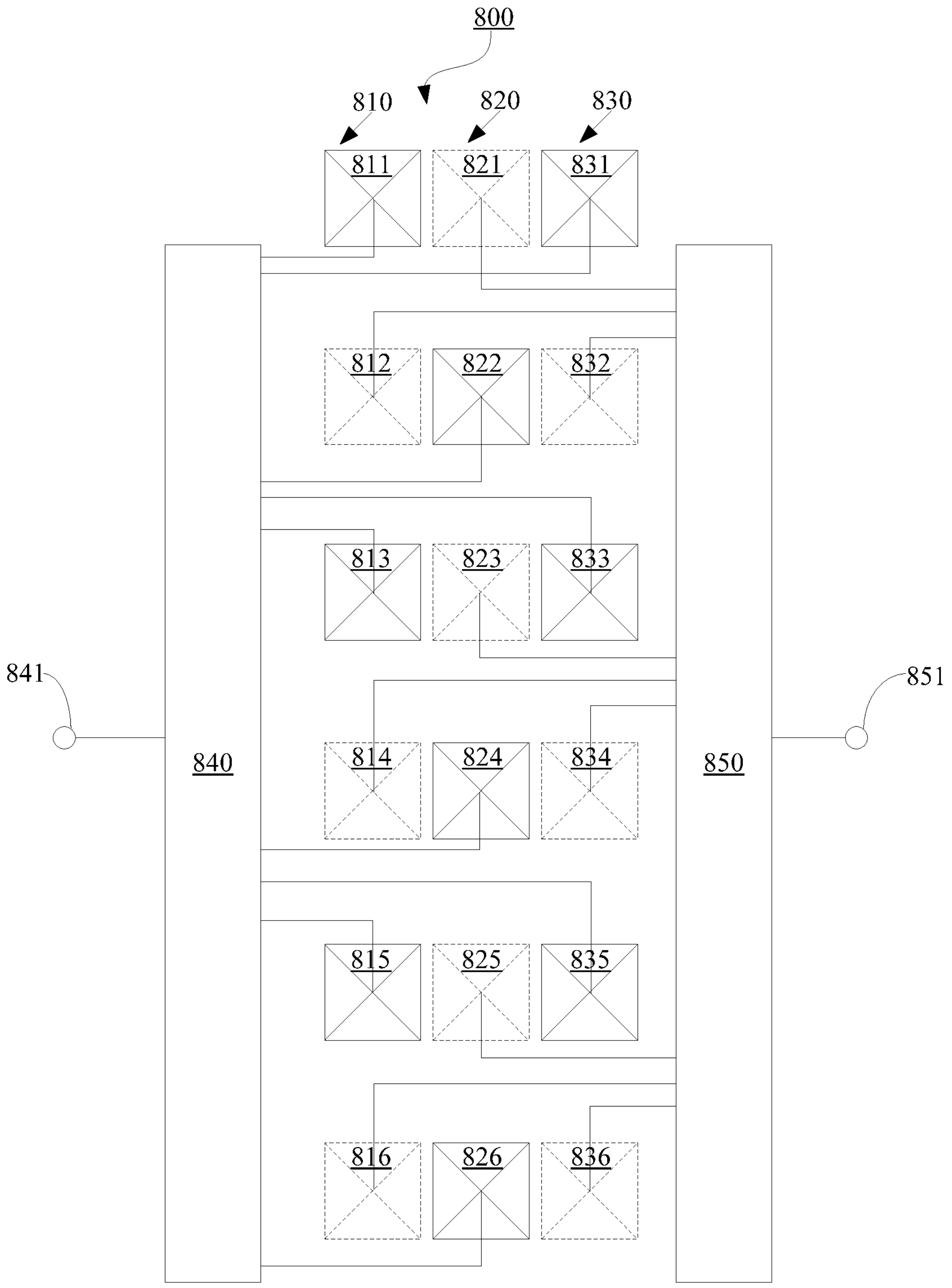
FIG. 8 is a schematic structural diagram of a radiation array group 800 according to some embodiments of the present disclosure.

FIG. 8 is a schematic structural diagram of a radiation array group 800 according to some embodiments of the present disclosure. As shown in FIG. 8, six rows of radiating elements are included. The radiation array group 800 of FIG. 8 has two more rows of radiating elements than the radiation array group 100 of FIG. 1. As shown in FIG. 8, the radiation array group 800 of the present disclosure includes three columns of radiating elements. The three columns of radiating elements include a plurality of first radiating elements 811, 812, 813, 814, 815, and 816 in the first column 810, a plurality of second radiating elements 821, 822, 823, 824, 825, and 826 in the second column 820, and a plurality of third radiating elements 831, 832, 833, 834, 835, and 836 in the third column 830. A first radiating element and a third radiating element in the same row can be electrically connected. For example, the first radiating element 811 is electrically connected to the third radiating element 831, the first radiating element 812 is electrically connected to the third radiating element 832, the first radiating element 813 is electrically connected to the third radiating element 833, the first radiating element 814 is electrically connected to the third radiating element 834, the first radiating element 815 is electrically connected to the third radiating element 835, and the first radiating element 816 is electrically connected to the third radiating element 836. To represent the connection relationship, the radiating elements that are electrically connected are represented by the same symbol in FIG. 8. For example, the radiating element 811 and the radiating element 831 that are electrically connected are represented by solid lines, and the radiating element 812 and the radiating element 832 that are electrically connected are represented by dashed lines.

In general, each radiating element of the plurality of first radiating elements 811, 812, 813, 814, 815, and 816, the plurality of second radiating elements 821, 822, 823, 824, 825, and 826, and the plurality of third radiating elements 831, 832, 833, 834, 835, and 836 can belong to the first element group for forming the first two-port radiation array group or the second element group for forming the second two-port radiation array group. The first element group for forming the first two-port radiation array group includes radiating elements 811, 831, 822, 813, 833, 824, 815, 835, and 826 represented by solid lines in FIG. 8. The second element group for forming the second two-port radiation array group includes radiating elements 821, 812, 832, 823, 814, 834, 825, 816, and 836 represented by dashed lines in FIG. 8.

Additionally, when the first radiating element and the third radiating element in the same row belong to the first element group, the second radiating element between the first radiating element and the third radiating element in the same row can belong to the second element group. For example, if the first radiating element 811 and the third radiating element 831 are in the same row, when the first radiating element 811 and the third radiating element 831 belong to the first element group represented by solid lines, the second radiating element 821 represented by dashed lines between the first radiating element 811 and the third radiating element 831 can belong to the second element group. That is, a radiating element in the first column and a corresponding radiating element in the third column can belong to the same element group, and a radiating element in the second column between the radiating element in the first column and the corresponding radiating element in the third column can belong to another element group.

Furthermore, a first radiating element and a third radiating element in the same row can be electrically connected via a power splitter. As seen in FIG. 8, the first radiating element 811 and the third radiating element 831 in the first row are electrically connected via a power splitter, and the first radiating element 811 and the third radiating element 831 are also electrically connected to the second radiating element 822 in the second row, and so forth. The first radiating element 811, the second radiating element 822, and the third radiating element 831 can be electrically connected, because the first radiating element 811, the second radiating element 822, and the third radiating element 831 are represented by solid lines. Correspondingly, the radiating elements represented by dashed lines can also be electrically connected via the power splitter via the power splitter. With such a connection, radiating elements represented by solid lines can be electrically connected via a power splutter 840, and radiating elements represented by dashed lines can be electrically connected via a power splitter 850. Then, signals can be input through a signal connection ends 841 and 842. In addition, according to an embodiment of the present disclosure, the radiation array group can further include a reflection board (not shown in the figure). The reflection board can be configured to fix the three columns of radiating elements on the reflection board. In some embodiments, the power splitter 840 and 850 and the corresponding signal connection ends 841 and 842 can also be arranged on the reflection board. In addition, according to the exemplary radiation array group shown in FIG. 5 and FIG. 8, a first quantity of radiating elements in the first element group can be the same as a second quantity of radiating elements in the second element group.

Moreover, a second aspect of the present disclosure provides a narrow-beam antenna. The narrow-beam antenna can include a radiation array group 100, 200, 300, 400, 500, 600, 700, or 800 and a power dividing board connected to the radiation array group. In some embodiments of the present disclosure, the narrow-beam antenna can be a 45-degree beam antenna. In some embodiments of the present disclosure, the narrow-beam antenna can include four ports.

In summary, the first radiating element and the third radiating element in the same row are electrically connected and can belong to the first element group for forming a two-port radiation array group. The second radiating element in the same row or approximately in the same row as the first radiating element can belong to the first element group for forming another two-port radiation array group. Then, the distance between the three elements can be significantly reduced. Thus, the width of the radiation array group may not be increased or may be slightly increased. Meanwhile, since the radiation array group includes the first element group and the second element group for forming the two-port radiation array group, the radiation array group of the present disclosure can form a four-port radiation array group.

Although various exemplary embodiments of the present disclosure have been described, for those skilled in the art, various changes and modifications can be made and can implement one or some advantages of the present disclosure without departing from the spirit and scope of the present disclosure. For those skilled in the art, other components for performing the same function can be replaced. When the feather described by a certain accompanying drawing can overlap with a feature combination of other accompanying drawings, even in the situation the feature and feature combination are not illustrated. In addition, the method can be implemented in a software implementation method of using appropriate processor instructions or in a hybrid implementation method of using the combination of the hardware logic and the software logic to obtain the same result. Thus, the modifications made to the technical solution of the present disclosure can be covered by the appended claims.

What is claimed is:

1. A radiation array group comprising:

three columns of radiating elements including a plurality of first radiating elements in a first column, a plurality of second radiating elements in a second column, and a plurality of third radiating elements in a third column, wherein:

a first radiating element and a third radiating element in a same row are electrically connected;

each radiating element of the plurality of first radiating elements, the plurality of second radiating elements, and the plurality of third radiating elements belongs to a first element group for forming a first two-port radiation array group or a second element group for forming a second two-port radiation array group; and when the first radiating element and the third radiating element in the same row belong to one of the first element group and the second element group, a second radiating element between the first radiating element and the third radiating element in the same row belong to the other one of the first element group and the second element group.

2. The radiation array group according to claim 1, wherein the first radiating element and the third radiating element in the same row are electrically connected via a power splitter.

3. The radiation array group according to claim 1, wherein the first radiating element and the third radiating element in the same row are in the same row with the second radiating element between the first radiating element and the third radiating element.

4. The radiation array group according to claim 1, wherein the first radiating element and the third radiating element in the same row are in a different row than the second radiating element between the first radiating element and the third radiating element.

5. The radiation array group according to claim 1, wherein each column of the three columns of radiating elements includes four radiating elements.

6. The radiation array group according to claim 1, wherein each column of the three columns of radiating elements includes six radiating elements.

7. The radiation array group according to claim 1, wherein the plurality of first radiating elements in the first column are alternately included in the first element group and the second element group.

8. The radiation array group according to claim 7, wherein the plurality of second radiating elements in the second column are alternately included in the second element group and the first element group.

9. The radiation array group according to claim 1, wherein a first quantity of radiating elements in the first element group is the same as a second quantity of radiating elements in the second element group.

10. The radiation array group according to claim 1, further comprising:

a first independent array radiating element group and a second independent array radiating element group respectively at a first row and a last row away from center positions, the first independent array radiating element group and the second independent array radiating element group each including at least two radiating elements, and the at least two radiating elements of the first independent array radiating element group belonging to the first element group, and the at least two radiating elements of the second independent array radiating element group belonging to the second element group.

11. The radiation array group according to claim 1, further comprising a reflection board configured to fix the three columns of radiating elements at the reflection board.

12. A narrow-beam antenna comprising:

a radiation array group; and a power-dividing board connected to the radiation array group, wherein the radiation array group comprises:

three columns of radiating elements including a plurality of first radiating elements in a first column, a plurality of second radiating elements in a second column, and a plurality of third radiating elements in a third column, wherein:

a first radiating element and a third radiating element in a same row are electrically connected;

each radiating element of the plurality of first radiating elements, the plurality of second radiating elements, and the plurality of third radiating elements belongs to a first element group for forming a first two-port radiation array group or a second element group for forming a second two-port radiation array group; and when the first radiating element and the third radiating element in the same row belong to one of the first element group and the second element group, a second radiating element between the first radiating element and the third radiating element in the same row belong to the other one of the first element group and the second element group.

13. The narrow-beam antenna according to claim 12, wherein the narrow-beam antenna is a 45-degree beam antenna.

14. The narrow-beam antenna according to claim 12, wherein the narrow-beam antenna has four ports.

15. The narrow-beam antenna according to claim 12, wherein the first radiating element and the third radiating element in the same row are electrically connected via a power splitter.

16. The narrow-beam antenna according to claim 12, wherein the first radiating element and the third radiating element in the same row are in the same row with the second radiating element between the first radiating element and the third radiating element.

17. The narrow-beam antenna according to claim 12, wherein the first radiating element and the third radiating element in the same row are in a different row than the second radiating element between the first radiating element and the third radiating element.

18. The narrow-beam antenna according to claim 12, wherein each column of the three columns of radiating elements includes four radiating elements.

19. The narrow-beam antenna according to claim 12, wherein each column of the three columns of radiating elements includes six radiating elements.

20. The narrow-beam antenna according to claim 12, wherein the plurality of first radiating elements in the first column are alternately included in the first element group and the second element group.

* * * * *